US012592354B2

(12) United States Patent
Kirkham et al.

(10) Patent No.: US 12,592,354 B2
(45) Date of Patent: Mar. 31, 2026

(54) MODULAR GETTERS AND GETTERS WITH DIFFERENT MATERIALS IN VACUUM ENCLOSURES

(71) Applicant: Varex Imaging Corporation, Salt Lake City, UT (US)

(72) Inventors: Dave Kirkham, South Jordan, UT (US); Amber McMullin, Provo, UT (US); Vance Scott Robinson, South Jordan, UT (US); Jake Riggle, Bountiful, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 292 days.

(21) Appl. No.: 18/176,458

(22) Filed: Feb. 28, 2023

(65) Prior Publication Data

US 2024/0290569 A1 Aug. 29, 2024

(51) Int. Cl.

| | |
|---|---|
| ***H01J 7/18*** | (2006.01) |
| ***F04B 37/02*** | (2006.01) |
| ***F04B 37/04*** | (2006.01) |
| ***H01J 19/42*** | (2006.01) |
| ***H01J 35/16*** | (2006.01) |
| ***H01J 35/20*** | (2006.01) |
| ***H01J 41/16*** | (2006.01) |

(52) U.S. Cl.

CPC .............. *H01J 7/186* (2013.01); *F04B 37/02* (2013.01); *F04B 37/04* (2013.01); *H01J 7/18* (2013.01); *H01J 19/42* (2013.01); *H01J 35/16* (2013.01); *H01J 41/16* (2013.01); *H01J 35/20* (2013.01); *H01J 2235/166* (2013.01); *H01J 2235/205* (2013.01)

(58) Field of Classification Search

CPC .. H01J 41/16; H01J 7/186; H01J 29/94; H01J 7/18; H01J 19/42; H01J 35/16; F04B 37/02; F04B 37/04

See application file for complete search history.

(56) References Cited

U.S. PATENT DOCUMENTS 3,357,634 A * 12/1967 Maliakal ................. H01J 41/16 417/49

FOREIGN PATENT DOCUMENTS

| | | |
|---|---|---|
| JP | S54102962 A | 8/1979 |
| JP | S63218146 A | 9/1988 |
| JP | H071561 U | 1/1995 |

OTHER PUBLICATIONS

Int'l Appl. No. PCT/US2024/0177611, International Search Report dated Aug. 14, 2024.

Int'l Appl. No. PCT/US2024/0177611, Written Opinion dated Aug. 14, 2024.

* cited by examiner

*Primary Examiner* — Peter J Bertheaud

(74) *Attorney, Agent, or Firm* — Dorsey & Whitney LLP

(57) ABSTRACT

Some embodiments include an apparatus, comprising: a vacuum enclosure including an opening; a support structure disposed in the vacuum enclosure, the support structure comprising: a first portion attached to the vacuum enclosure at the opening; and a second portion extending within the vacuum enclosure; and a plurality of getters disposed on the second portion of the support structure.

20 Claims, 8 Drawing Sheets

MODULAR GETTERS AND GETTERS WITH DIFFERENT MATERIALS IN VACUUM ENCLOSURES

Vacuum enclosures and, in particular, vacuum enclosures for x-ray sources may rely on a particular vacuum level during operation. Leakage or other sources of molecules within the vacuum enclosure may increase the pressure within the vacuum enclosure. Getters may be used to adsorb or absorb atoms and molecules that are produced to maintain the vacuum level.

DETAILED DESCRIPTION

Embodiments relate to modular getters and getters with different materials in vacuum enclosures. Getters include materials that may adsorb gasses. The getters may be placed within a vacuum enclosure to capture gasses, such as gasses produced during bakeout operations or other manufacturing operations, or gasses remaining after pulling a vacuum. As will be described in further detail below, an apparatus may include multiple getters and multiple getters with different materials.

Figure 1A:
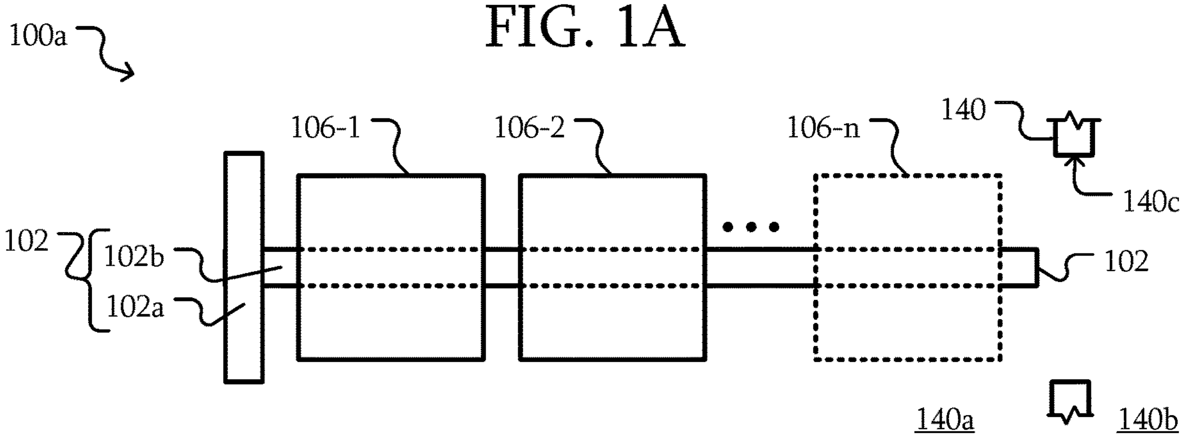
FIGS. 1A-1C are block diagrams of an apparatus including a modular getter according to some embodiments.
Figure 1B:
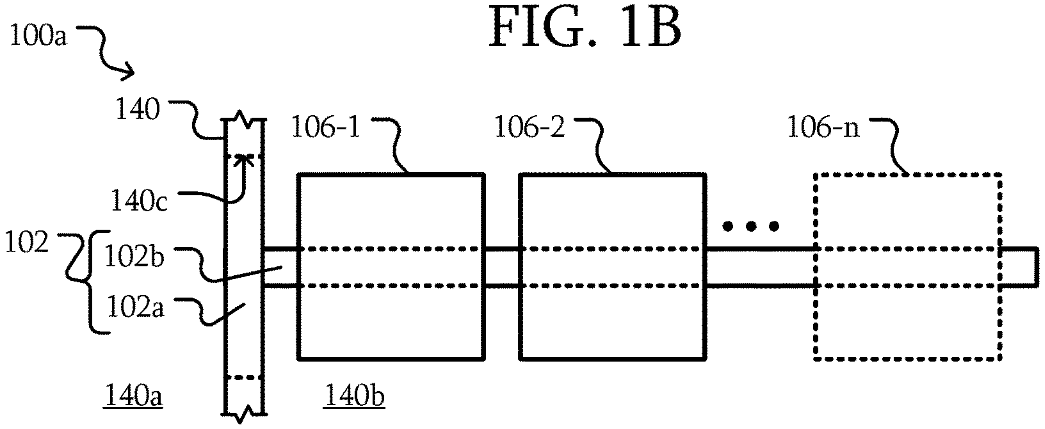
Figure 1C:
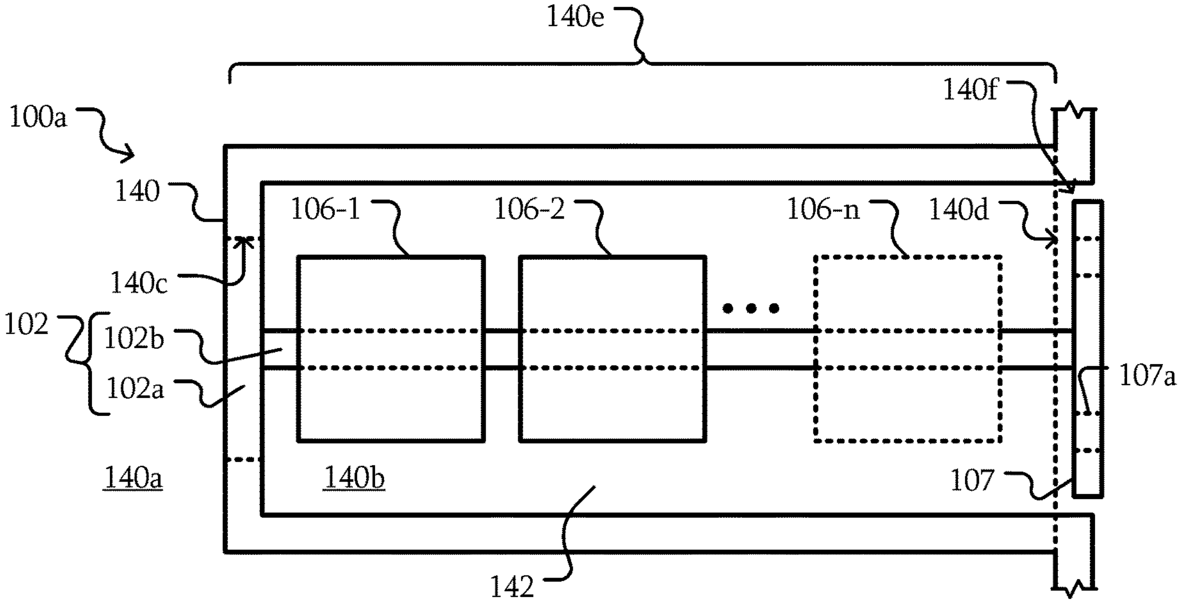

FIGS. 1A-1C are block diagrams of an apparatus including a modular getter according to some embodiments. Referring to FIGS. 1A and 1B, the apparatus 100*a* includes a support structure 102. Multiple getters 106 are disposed on the second portion 102*b* of the support structure 102. The number of getters 106 may be N where N is any integer greater than one. The getters 106 are components configured to capture atoms or molecules (found in gasses). Capturing includes collecting, adsorbing, or absorbing atoms and molecules that can be found in gasses. The getters 106 may capture atoms or molecules within the interior 140*b* of the vacuum enclosure 140. The atoms and molecules can be collected or adsorbed on the surface of the getters 106 or the atoms or molecules can be absorbed or diffused within the bulk material of the getters 106.

In some embodiments, an apparatus 100*a* includes a vacuum enclosure 140 configured to divide an interior 140*b* having the vacuum from the exterior 140*a*. The vacuum enclosure 140 includes an opening 140*c*. The support structure 102 and the attached components may be configured to be insertable through the opening 140*c* into the interior 140*b*. For example, dimensions of the getters 106 may be selected that the getters 106 may pass through the opening 140*c* from the exterior 140*a* of the vacuum enclosure 140. For example, the opening 140*c* may be circular. The getters 106 may be cylindrical with diameters smaller than a diameter of the circular opening 140*c*. In other examples, the opening may have a different shape, such as a polygon, and the getter 106 may have corresponding features and dimensions that are smaller than the opening 140*c*.

The support structure 102 includes a first portion 102*a* configured to be attached to the vacuum enclosure 140 and a second portion 102*b* extending within the interior 140*b* of the vacuum enclosure 140 when attached to the vacuum enclosure 140. Although the interface between the first portion 102*a* and the vacuum enclosure 140 at the opening 140*c* has been illustrated as a butt joint, in other embodiments, the first portion 102*a* may be attached to the vacuum enclosure 140 using a different interface. Furthermore, the interface between the first portion 102*a* and the second portion 102*b* has been illustrated as perpendicular or orthogonal to each other, in other embodiments, the second portion 102*b* may be at an angle to the first portion 102*a*. FIG. 1A shows the support structure 102 and associated components being disposed on the exterior 140*a* of the vacuum enclosure 140 before insertion. FIG. 1B shows the support structure 102 attached to the vacuum enclosure 140 with at least some of the associated components disposed on the interior 140*b*.

In some embodiments, the support structure 102 is electrically connected to the vacuum enclosure 140. The support structure 102 may be at the same electrical potential as the vacuum enclosure 140. For example, the support structure 102 may be welded to a metal wall of the vacuum enclosure 140 at the opening 140*c*.

In some embodiments, the apparatus 100*a* allows for a modular getter 106. For example, each of the getters 106 may be the same type of getter. The getters 106 may be purchased in bulk to reduce the cost. However, different vacuum enclosures 140, vacuum enclosures 140 with different volumes, different applications using the vacuum enclosure 140, or the like may have a need for a different capacity, different preferred species, or different activation temperature of the getters 106. Capacity refers to the amount or quantity of atoms or molecules that a getter 106 can capture. Species refers to the material or structure of a getter 106. For example, some getters 106 may have a material with a preference for components of air and noble gasses while others may have a preference for oxygen. Activation temperature refers to the temperature when a getter 106 starts to substantially capture atoms or molecules. For example, some getter 106 materials may be activated at about 1600 to 2000 degrees Celsius (° C.) while others may be activated at different temperatures such as about 700 to 1300° C. In some embodiments, getters 106 may activate at a temperature below a bakeout temperature of the vacuum enclosure 140. Such getters 106 may be activated during the bakeout process and may not require a separate activation step. Getters 106 may have a preferred activation temperature the enables the getters 106 to collect molecules and atoms from the surrounding vacuum at an associated maximum pumping speed and capacity. However, the getters 106 may be partially activated. For example, the getter 106 may be heated to a lower temperature, resulting in reduced capacity and pumping speed. Once fully or partially activated, a getter 106 may remain activated even if the temperature falls below the activation temperature. A getter 106 may remain active until the getter 106 has captured the associated full capacity of atoms or molecules. The getter 106 may become inactive as the getter 106 may not be able to capture more atoms or molecules, or the amount that may be captured may be significantly reduced. A getter may be re-activated. For example, a getter 106 may be heated, causing the getter 106 to exhaust a portion of the captured atoms or molecules. Those atoms or molecules may be pumped out of the vacuum enclosure 140, such as by a background pumping system like a turbo pump, ion pump, or the like. The getter 106 may then have the capacity to collect more atoms or molecules. A single getter for each situation may be used; however, that may increase the number of components, part numbers, or the like for production and maintenance of the associated systems. However, with a modular getter apparatus 100*a*, the number of different components, part numbers, or the like may be reduced. In particular, for a situation where a lower capacity is needed, fewer getters 106 may be installed on the support structure 102; however, where a higher capacity is needed more getters 106 of the same type may be installed on the support structure 102. Accordingly, a custom getter would not be needed for each different application. Rather, an apparatus 100*a* with getters 106 may be created for each different application from the same components, such as the same support structure 102 or constituent components, and a desired number of the individual getters 106. While embodiments include multiple getters 106, in some embodiments, only a single getter 106 may be present even though the support structure 102 has the capacity for multiple getters 106.

The apparatus 100*a* with modular getters 106 may also result in fewer electrical feedthroughs, fewer penetrations of the vacuum enclosure 140, and/or fewer seams, welds, or other penetrations of the vacuum enclosure 140. A number of points of failure that may result in vacuum leaks may be reduced. A reduction in electrical feedthroughs may reduce the cost as such structures may be relatively complex and expensive.

Referring to FIG. 1C, in some embodiments, the vacuum enclosure 140 includes a major exterior surface 140*d*. A protrusion 140*e* of the vacuum enclosure may extend towards the exterior 140*a*. The walls of the protrusion 140*e* may surround the support structure 102 and the getters 106 in a region 142 of interior 140*b*. The region 142 may be continuous with the remainder of the interior 140*b* through an opening 140*f*.

A conductive plate 107 may be disposed at an end of the support structure opposite to the first portion 102*a*. The conductive plate 107 may be electrically connected to the first portion 102*a* and to the vacuum enclosure 140. The conductive plate 107 may be disposed at or near the opening 140*f*. The conductive plate 107 may include openings 107*a*. The openings may allow gasses that are within the interior 140*b* to pass into the region 142 and be captured by the getters 106.

A conductive plate 107 may be disposed at an end of the support structure 102 at the opening 140*f* such that an electric field strength around the opening 140*f* is as uniform as possible with electric field along the internal surfaces of the vacuum enclosure. For example, when the potential of the vacuum enclosure 140 and the conductive plate 107 are the same or similar, electric fields within the region will be relatively low even if higher strength electric fields are present in the remainder of the interior 140*b*. As a result, a chance of arcing near the getters 106 may be reduced.

Figure 2:
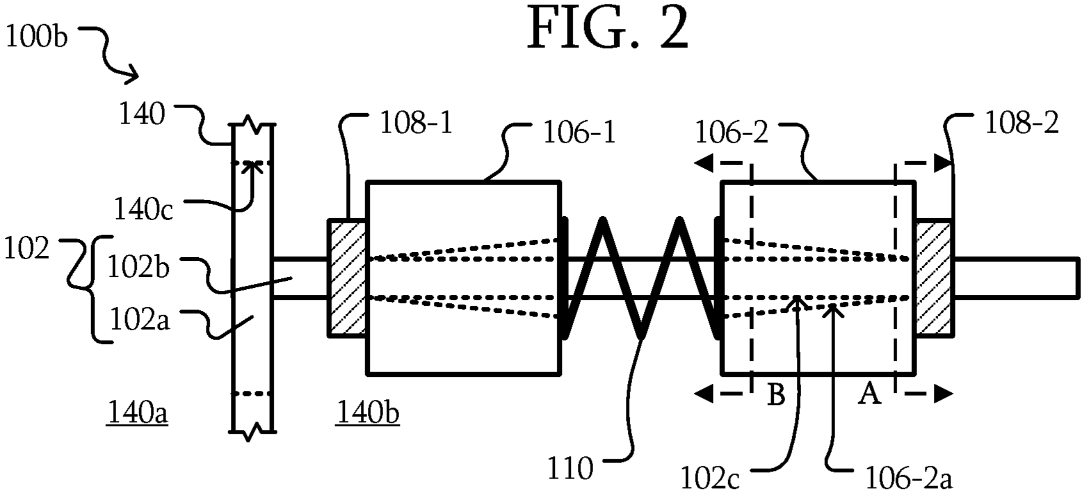
FIG. 2 is a block diagram of an apparatus including a modular getter according to some embodiments.

FIG. 2 is a block diagram of an apparatus including a modular getter according to some embodiments. In some embodiments the apparatus 100*b* may be similar to other apparatuses 100 described herein. While the apparatus 100*b* may include N getters 106, only two getters 106 will be used as an example.

The apparatus 100*b* includes at least one rigid component 108 and at least one resilient component 110. A rigid component 108 is a component that is rigidly attached to the support structure 102. In some embodiments, the rigid component 108 may include a washer, a nut, a protrusion or the like of the supporting structure 102. Each of the getters 106 contacts a corresponding rigid component 108. In this example, getter 106-1 contacts rigid component 108-1 and getter 106-2 contacts rigid component 108-2.

A resilient component 110 is a component that may accommodate changes in size and attempt to return to the original size. In some embodiments, a resilient component 110 includes a spring, a compressible structure, or the like. Movement of each of the getters 106 is constrained at least in part by a corresponding resilient component 110. In this example, getters 106-1 and 106-2 contact resilient component 110. However, in other embodiments, each getter 106-1 and getter 106-2 may be associated with a different resilient component 110. In addition, in other embodiments, the getters 106 may not directly contact the corresponding resilient component 110. A getter 106 and the corresponding resilient component 110 may be separated by another component that may be movable relative to the corresponding rigid component 108, such as a washer disposed between the getter 106 and the corresponding resilient component 110 that is movable along the support structure 102.

Accordingly, the resilient component 110 puts pressure on the getters 106. The getters are pushed into the corresponding rigid components 108 and are substantially held in place. The getters 106 may be held in place during handling, insertion, welding, operation, or the like. The resilient component 110 may accommodate thermal expansion of the getters 106, the support structure 102, or the like.

Figure 3A:
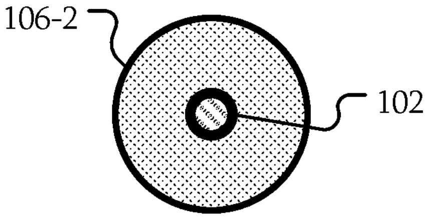
FIGS. 3A-3B are cross-sectional views of a getter of FIG. 2 according to some embodiments
Figure 3B:
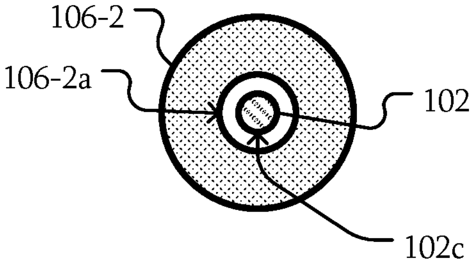

FIGS. 3A-3B are cross-sectional views of a getter of FIG. 2 according to some embodiments. FIG. 3A, is cross-section A of FIG. 2 and FIG. 3B is cross-section B of FIG. 2. Referring to FIGS. 2-3B, in some embodiments, the resilient component 110 may allow for atoms or molecules to reach an inner surface of the getters 106. In this example, the getters 106 have a generally cylindrical shape with an opening to accommodate the support structure 102. However, at cross-section A, the getter 106-2 may contact the support structure 102. Although the getter 106-2 is illustrated as contacting the support structure 102 around the entire circumference of the support structure 102, in other embodiments, the amount of contact may be less. Because of the pressure of the resilient component 110, the getter 106-2 may be pushed into the rigid component 108-2, limiting the transfer of atoms or molecules to the inner opening of the getter 106-2.

However, at cross-section B, the diameter of the opening is larger. As a result, the surface of the getter 106-2*a* is offset from the surface 102*c* of the support structure 102. The resilient component 110 may permit atoms or molecules to enter that opening. As a result, more surface area of the getter 106-2 is available to capture atoms or molecules from within the interior 140*b* of the vacuum enclosure 140.

Figure 4:
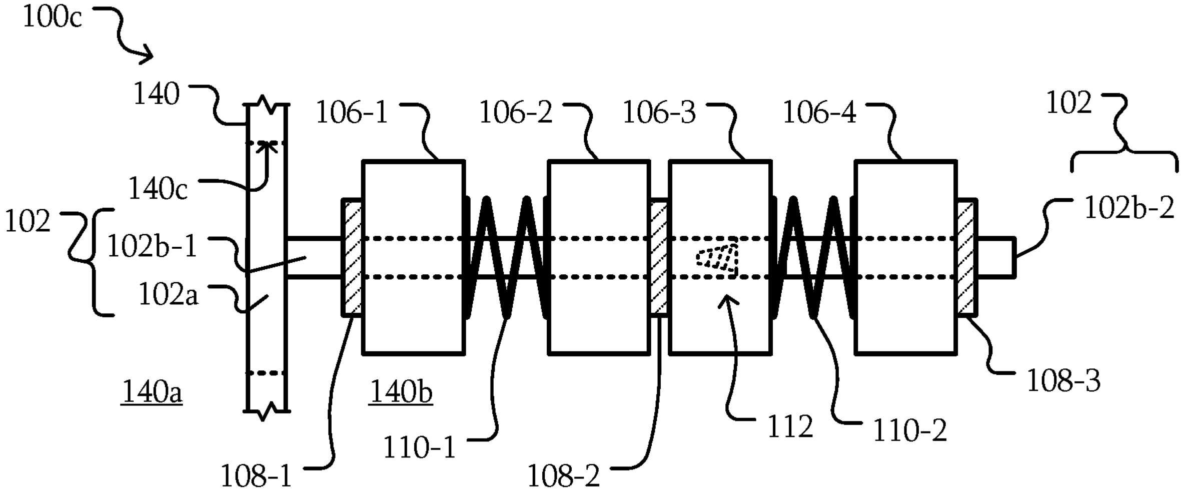
FIG. 4 is a block diagram of an apparatus including a modular getter with an extendible support structure according to some embodiments.

FIG. 4 is a block diagram of an apparatus including a modular getter with an extendible support structure according to some embodiments. The apparatus 100*c* may be similar to apparatuses 100 described herein. The support structure 102 that is extendible includes multiple separate second portions 102*b* that can be connected together. While two second portions 102*b*-1 and 102*b*-2 are illustrated as an example, in other embodiments the number of second portions 102*b* may be greater than two.

The second portions 102*b* are connectable to extend the support structure 102 to be able to accommodate more getters 106. Although four getters 106-1 to 106-4 are illustrated as an example, in other embodiments, the number of getters 106 may be different.

In some embodiments, the second portions 102*b* are connectible by a threaded interface 112. The second portions 102*b* may include complementary threaded interfaces 112 such that the second portions 102*b* may be directly attached. However, in other embodiments, the second portions 102*b* may be attached in different ways. For example, the second portions 102*b* may be attached through a rigid component 108 such as a nut. Although the threaded interface 112 is illustrated as offset from the rigid component 108-2, in some embodiments, the interface between the second portions 102*b*-1 and 102*b*-2 may be coincident with the rigid component 108-2, may include the rigid component 108-2 as part of the connection between the second portions 102*b*-1 and 102*b*-2, or the like.

Figure 5A:
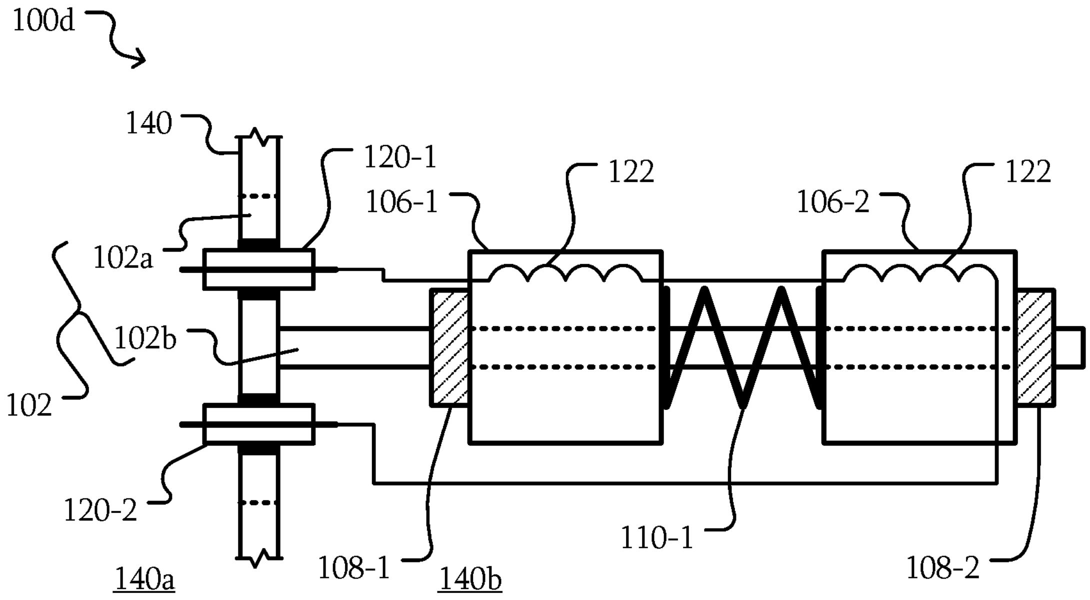
FIGS. 5A and 5B are block diagrams of apparatuses including a modular getter with electrical connections according to some embodiments.
Figure 5B:
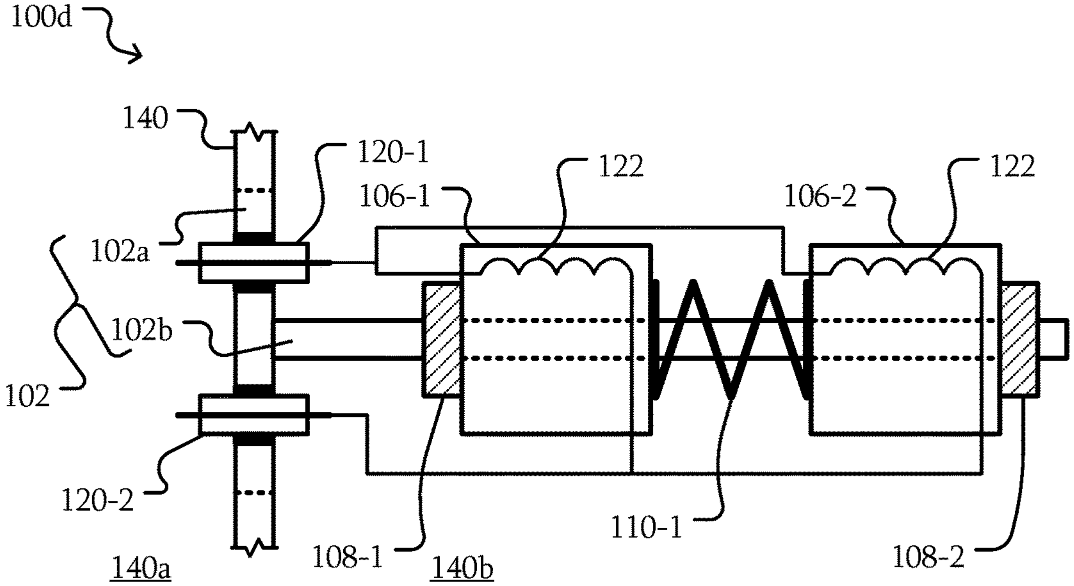

FIGS. 5A and 5B are block diagrams of apparatuses including a modular getter with electrical connections according to some embodiments. Referring to FIG. 5A, the apparatus 100*d* may be similar to the apparatuses 100 described herein. However, the apparatus 100*d* includes getters 106 with heating elements 122. In some embodiments, each of the getters 106 includes a heating element 122. In other embodiments, less than all, including only one getter 106 includes a heating element 122.

The support structure 102 includes multiple feedthroughs 120. In this example, the support structure 102 includes two feedthroughs 120 penetrating the first portion 120*a*. The feedthroughs 120 and the heating elements 122 are electrically connected. In this example, the heating elements 122 are electrically connected in series. When the heating elements 122 are electrically connected in series, each heating elements 122 may receive substantially the same current. As a result, the getters 106 may be substantially uniformly heated. In addition, while the voltage across the feedthroughs 120 may increase with more getters 106 and heating elements 122, the current would remain substantially the same. Accordingly, feedthroughs 120 rated for a particular current may be used for any number of getters 106 and associated heating elements 122 with respect to the current handling capability. The voltage may be higher with additional getters 106. However, the feedthroughs 120 may be able to handle higher voltages associated with multiple heating elements 122 in series. In addition, by coupling multiple heating elements 122 to two feedthroughs in series, a cost of the apparatus 100*d* may be reduced. Feedthroughs 120 and associated penetrations of the vacuum enclosure 140 may be relatively expensive. Coupling multiple getters 106 and associated heating elements 122 to fewer feedthroughs 120 than having a pair of feedthroughs 120 for each getter 106 and heating element 122 will reduce the cost. In addition, the structure will be more compact as less area on the vacuum enclosure 140 will be needed for additional feedthroughs 120. In addition, fewer feedthroughs result in fewer penetrations of the vacuum enclosure 140, which may reduce a number of potential failures.

In some embodiments, the getters 106 and the heating elements 122 are electrically floating relative to the vacuum enclosure 140. That is, while the voltage across the feedthroughs 120-1 and 120-2 may be fixed, the voltages of the feedthroughs 120 relative to the vacuum enclosure 104, relative to a ground, or the like may change. In some embodiments, only a single feedthrough 120 may be used with multiple getters 106. For example, feedthrough 120-2 may be omitted and the electrical connection may be instead formed to the vacuum enclosure 140. In some embodiments, using a single getter with the same or similar capacity as the multiple getters 106 may have a larger thermal mass. As a result, a higher current may be required to activate that single getter. By using multiple getters 106, the same or similar capacity without the higher current requirement.

In other embodiments, the heating elements 122 may be electrically connected in parallel. Referring to FIG. 5B, each end of each heating element 122 may be directly electrically connected to the feedthroughs 120-1 and 120-2. As a result, the voltage across each heating element 122 may be substantially the same within variation due to resistance of the electrical connections.

Figure 6:
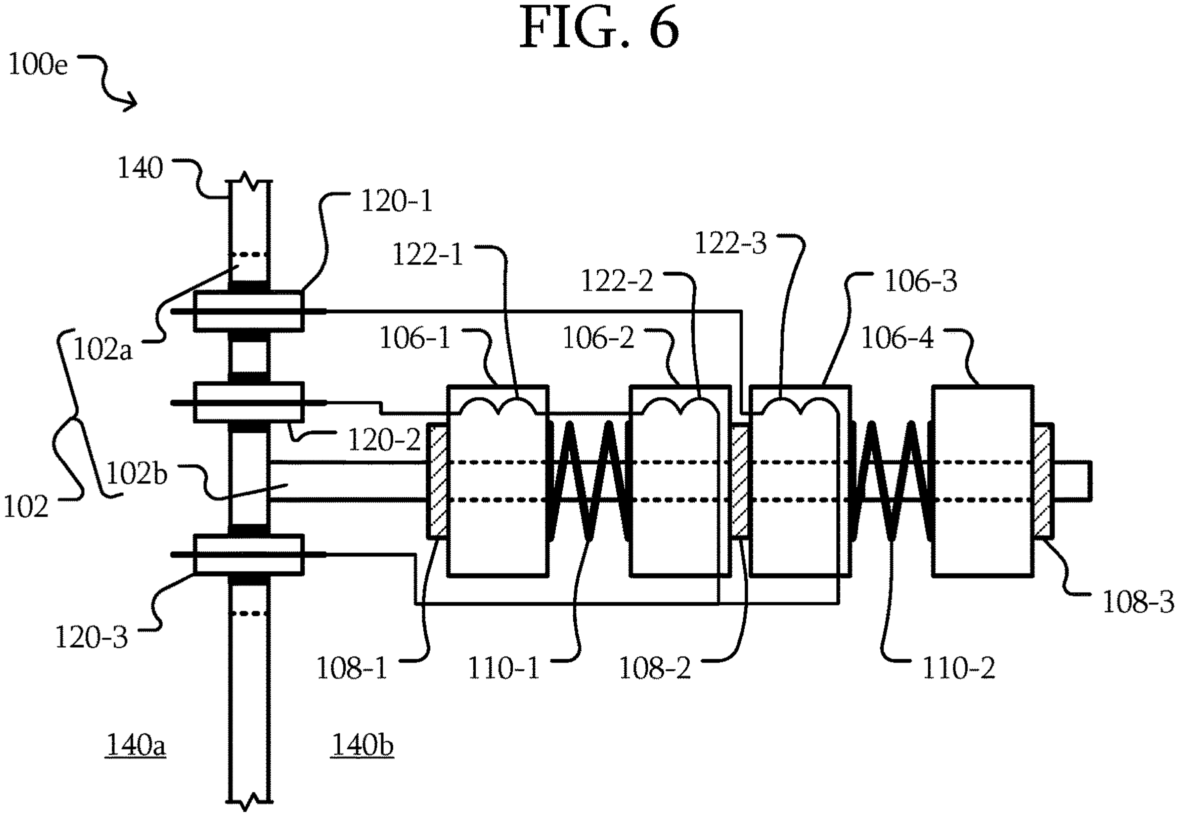
FIG. 6 is a block diagram of an apparatus including a modular getter with multiple electrical connections according to some embodiments.

FIG. 6 is a block diagram of an apparatus including a modular getter with multiple electrical connections according to some embodiments. The apparatus 100*e* may be similar to the apparatuses 100 describe herein. However, the apparatus 100*e* includes multiple individual or groups of getters 106 that are individually addressable.

In this example, three feedthroughs 120 penetrate the first portion 102*a* of the support structure 102. Heating elements 122-1 and 122-2 of getters 106-1 and 106-2, respectively, are electrically connected in series between feedthroughs 120-2 and 120-3. Heating element 122-3 of getter 106-3 is electrically connected between feedthroughs 120-1 and 120-3. As a result, heating element 122-3 may be activated independently of heating elements 122-1 and 122-2. Although heating elements 122-1 and 122-2 may be activated as a group through the same feedthroughs 120-2 and 120-3, in other embodiments, each heating element 122 may be electrically connected to a unique feedthrough 120. In addition, while each of the heating elements 122 shares a common feedthrough 120-3, in other embodiments, each individual heating element 122 or group of heating elements 122 may be electrically connected to a unique corresponding feedthrough 120.

In some embodiments, one or more getters 106 may not be electrically connected to any feedthroughs 120. Getter 106-4 is an example of such a getter 106. Although only one getter 106-4 is illustrated as an example, in other embodiments, multiple getters 106-4 that are not electrically connected to feedthroughs 120 may be present. Such getters 106 may be activated in ways other than electrically, such as during thermal process, such as a bakeout operation, through the vacuum enclosure 140 by induction or optically (e.g., a laser), or the like.

Figure 7:
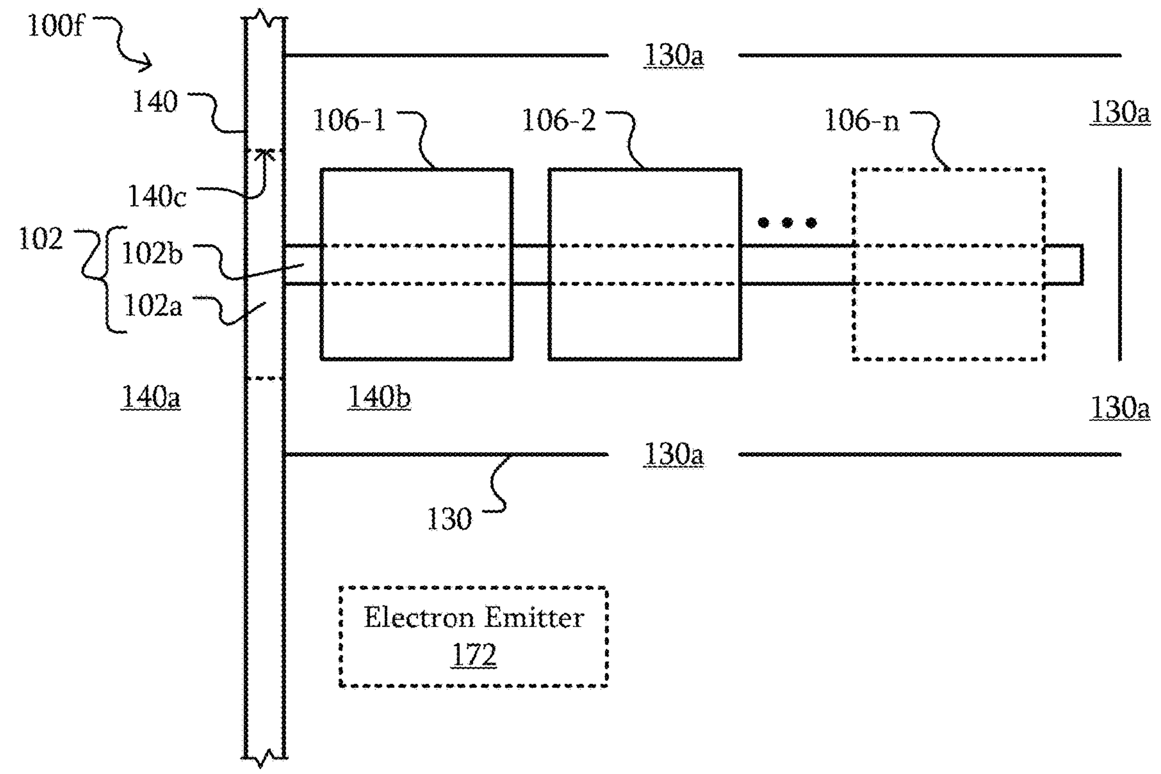
FIG. 7 is a block diagram of an apparatus including a modular getter with a shield according to some embodiments.

FIG. 7 is a block diagram of an apparatus including a modular getter with a shield according to some embodiments. The apparatus 100*f* may be similar to the apparatuses 100 described herein. However, the apparatus 100*f* includes a shield 130. The shield 130 is electrically connected to the vacuum enclosure 140.

In some embodiments, the apparatus 100*f* includes an electron emitter 172. The electron emitter 172 will be used as an example of a component disposed within the vacuum enclosure 140. Other examples include an anode, a grid, an electrode, or the like. Any of these structures may be at a high voltage relative to the vacuum enclosure 140, the support structure 102, the getters 106, or the like. Accordingly, a high electric field may be generated that may result in arcing, high voltage instability, or the like.

The shield 130 is disposed between the getters 106 and the electron emitter 172 or another component that is not at the same voltage potential as the getters 106. Accordingly, a strength of electric fields near the getters 106 may be reduced. The shield includes opening 130*a*. The shield 130 may include multiple openings 130*a*. The openings 130*a* allow for atoms or molecules to pass through the shield 130 and be captured by the getters 106.

In some embodiments, the getters 106 may not be disposed in a structure of the vacuum enclosure 140 that protrudes from the vacuum enclosure 140 into the exterior 140*a*. As a result, the getters 106 may otherwise be affected by higher electric fields than if the getters 106 were disposed within that protrusion. The shield 130 may reduce the strength of the electric fields near the getters 106.

The lack of a protrusion may reduce dimensions, costs, or the like of the apparatus 100*f*. For example, the overall dimensions of the apparatus 100*f* may be reduced. Dimensions of a casing around the apparatus 100*f* may be reduced. Thus, the apparatus 100*f* may be placed closer to other components. In addition, higher cost materials, such as lead, may be reduced, reducing the overall cost.

Figure 8:
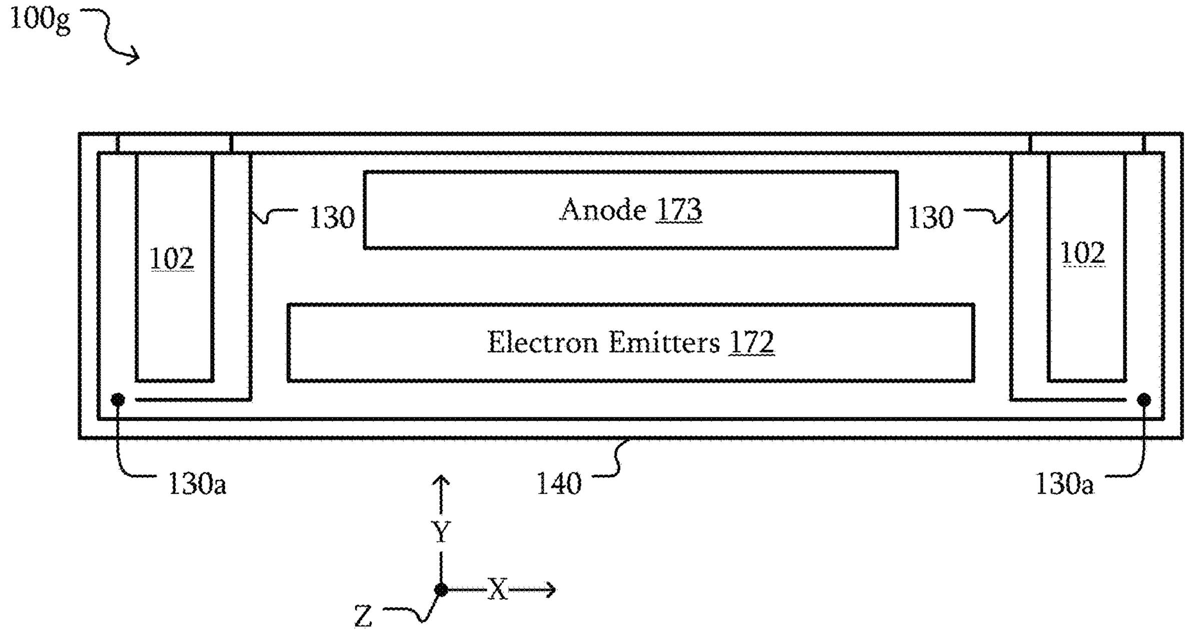
FIG. 8 is a block diagram of a of an apparatus including multiple modular getters according to some embodiments.

FIG. 8 is a block diagram of a of an apparatus including multiple modular getters according to some embodiments. In some embodiments, the apparatus 100*g* may be similar to the apparatuses 100 described herein. However, the apparatus 100*g* includes multiple modular getters, illustrated here with the corresponding multiple support structures 102. In this example, two support structures 102 with multiple getters 106 (not illustrated) are disposed within the vacuum enclosure 140. each similar to the support structures 102 with getters 106 described above.

The support structures 102 are disposed at distal ends of the vacuum enclosure in the X axis. At each end, a shield 130 with openings 130*a* separates the support structure 102 and the getters 106 from structures such as the electron emitters 172, the anode 173, or the like. In some embodiments, the shield 130 is a metal or conductive plate attached to the vacuum enclosure 140. The openings 130*a* may include gaps between the metal or conductive plate and the wall of the vacuum enclosure 140.

In some embodiments, the electron emitters 172 may include multiple field emitters such as carbon nanotube emitters. Field emitters may be more sensitive to vacuum levels. For example, an x-ray source without field emitters may operate with a vacuum level on the order of $10^{-7}$ to $10^{-8}$ torr and maintain a sufficient reliability, lifetime, or the like. However, due to the structure of field emitters, an operating vacuum level may be an order of magnitude lower at about $10^{-8}$ to $10^{-9}$ torr for similar reliability, lifetime, or the like. The additional getters 106 on the support structures 102 allow for the vacuum level to reach the desired level. Getters 106 can maintain vacuum levels and even reduce vacuum levels (or vacuum pressure) by a factor of ten (an order of magnitude lower) or a factor of a hundred. For example, the vacuum level on the order of $10^{-7}$ to $10^{-8}$ torr can be reduced with getters 106 (or additional getters 106) to vacuum level at about $10^{-8}$ to $10^{-9}$ torr.

The shield 130 may be disposed in a location based on the relative voltage difference. In some embodiments, the anode 173 may be at a high voltage relative to the getter 106 on the support structure 102. The getters 106 and the electron emitters 172 may both be at ground or at a relative voltage difference that may likely not result in arcing. Thus, the shield 130 may be disposed between the getters 106 and the anode 173. In other embodiments, both the anode 173 and the electron emitters 172 may be at voltage where a magnitude of the difference from the voltage of the getters 106 may be relatively high, such as in a dual ended configuration.

Figure 9:
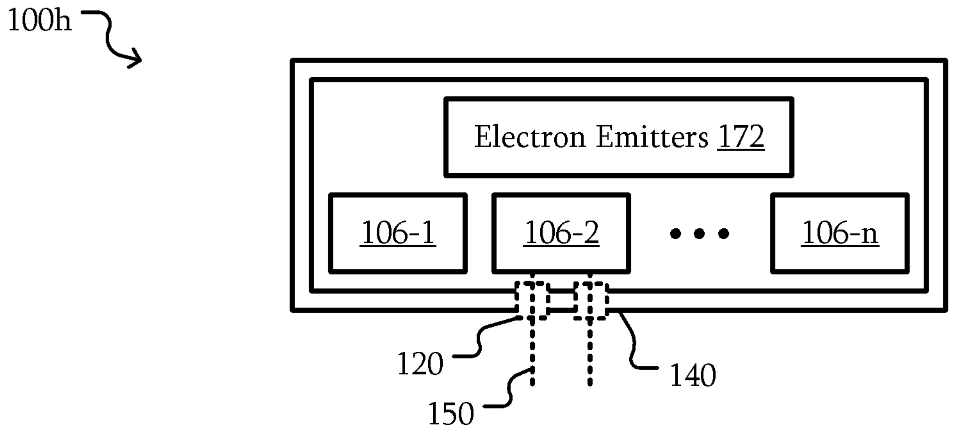
FIG. 9 is a block diagram of an x-ray source with multiple getters according to some embodiments.

FIG. 9 is a block diagram of an x-ray source with multiple getters according to some embodiments. The apparatus 100*h* includes a vacuum enclosure and an electron emitter 172 similar to the those described above. Multiple different types of getters 106 are disposed within the vacuum enclosure 140. Materials of the getters 106 are different. At least one of the getters 106 has a material that is different from a material of another one of the getters 106.

In some embodiments, the getters 106 may have different activation temperatures. For example, a first getter 106-1 may be configured to activate at temperatures used during a bakeout operation for the apparatus 100*h*. Bakeout may be one of many thermal processes for the apparatus 100*h*. An example of such a temperature is about 400 degrees Celsius (° C.) or less. However, getter 106-2 may be activated at a higher temperature, such as greater than 400° C. While 400° C. has been used as an example of a temperature between the activation temperatures of the getters 106-1 and 106-2, in other embodiments, a different temperature or different temperature range may exist between the activation temperatures of the 106-1 and 106-2. The bakeout operation temperature may be at that temperature or within that temperature range. As a result, while the capacity of getter 106-1 may be used during the bakeout operation and subsequent processing, the capacity of getter 106-2 may not be used as it has not been activated.

Getter 106-2 may be activated differently, such as through joule heating through an electrical connection 150 through feedthroughs 120 including using features similar to the heating element 122 described above. After bakeout is complete, the capacity of getter 106-1 may be consumed, possibly to the full capacity of the getter 106-1. Getter 106-2 may be activated later, such as before shipping, before pinch off of the vacuum, or the like. As a result, the capacity of the getter 106-2 may last through a lifetime of the apparatus 100*h*.

In some embodiments, at least one of the getters 106 is not electrically connected to the feedthroughs 120. In addition, at least one of the getters 106 is electrically connected to the feedthroughs 120. Thus, at least one getter 106 may be activated electrically while another getter 106 may be activated by other mechanisms such as ambient temperature, local temperature, inductive or optical energy transfer through the vacuum enclosure, or the like.

In some embodiments the different materials of the getters 106 may allow for the capture for different atoms or molecules. Examples of different materials of the getters 106 include tantalum, zirconium, titanium, aluminum, magnesium, thorium, alloys such as barium zirconia, titanium molybdenum, titanium salicides, or the like.

Figure 10A:
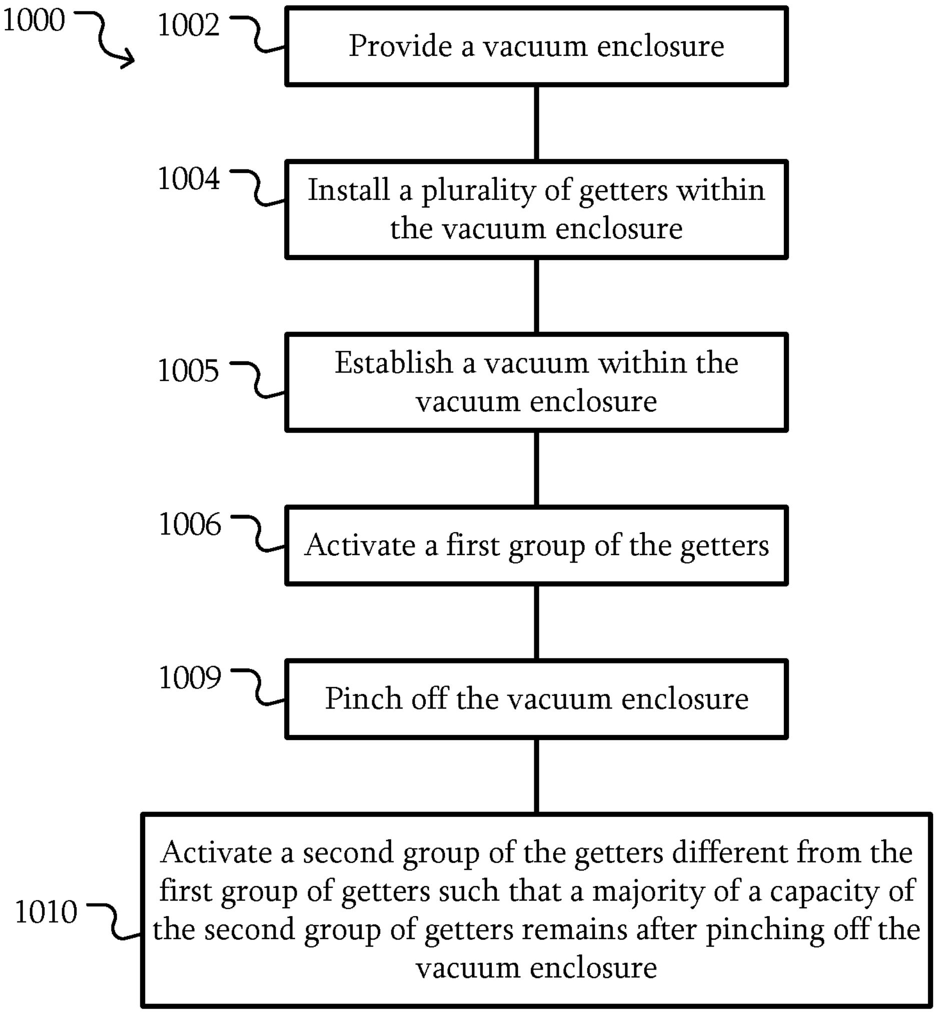
FIGS. 10A and 10B are flowcharts of techniques of manufacturing an apparatus according to some embodiments.
Figure 10B:
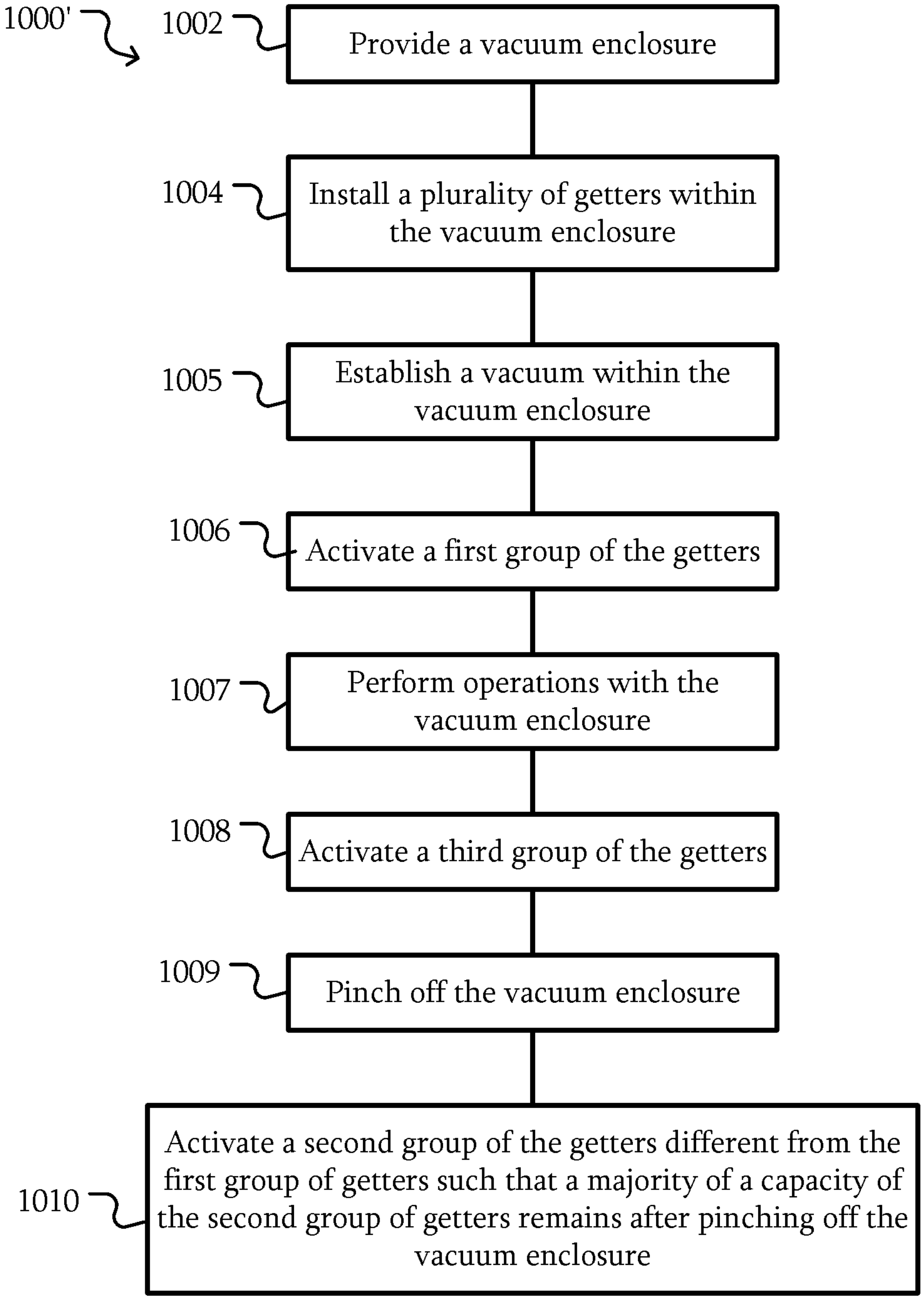

FIGS. 10A and 10B are flowcharts of techniques of manufacturing an apparatus according to some embodiments. Referring to FIG. 10A, the apparatus 100*h* of FIG. 9 will be used as an example for explain the operation in 1000. Referring to FIGS. 9 and 10A, in some embodiments, a vacuum enclosure 140 may be provided in 1002. The vacuum enclosure may have substantially all components other than getters 106 and associated support structures 102 when provided. However, in other embodiments, some components may be installed later.

In 1004, multiple getters 106 are installed within the vacuum enclosure 140. The getters 106 may be any of the getters 106 described above where a material of at least one of the getters 106 is different from a material of at least another one of the getters 106. The difference in the material may result in a difference in technique of activation (i.e., by joule heating, laser heating, radiant heating, inductive heating, or the like), preferred atom or molecule species, sets of species, activation temperature, or the like. The getters 106 may be installed by inserting a support structure 102 including the getters 106 into an opening 140*c* in the vacuum enclosure. The support structure 102 may then be welded to the vacuum enclosure 140.

In 1005, a vacuum is established in the vacuum enclosure below a threshold. For example, the threshold may be on the order of $10^{-5}$ torr, $10^{-7}$ torr, or less; however, in other embodiments, the threshold may be different.

In 1006, a group of the getters 106 are activated. For example, as will be described in further detail below, in some embodiments, a operations may be performed using the vacuum enclosure 140. Some getters 106 may be activated by ambient heat during the operation. Some getters 106 may be activated by joule heating through feedthroughs 120. In some embodiments, some getters 106 may be adjacent to structures that may be locally heated. For example, an anode outgassing operation may be performed by directing an electron beam towards the anode. As a result, a temperature of the anode and the local area increases. The increased temperature in the local area may be sufficient to activate adjacent getters 106. Regardless of how activated, less than all of the getters 106 are activated, leaving at least some getters 106 as not activated.

In 1009, the vacuum enclosure 1010 is pinched off. The vacuum level may be changed until the vacuum level has stabilized at a desired level such as about $10^{-8}$ to $10^{-9}$ torr. In 1010, a second group of the getters 106 that was not activated with the first group of getters 106 in 1006 are now activated. For example, a getter 106 that was not previously activated may be activated through joule heating using feedthroughs 120. As a result of waiting until after pinching off the vacuum enclosure 140, a majority of a capacity of the at least one of the getters 106 that was not activated remains. Substantially all of the capacity may remain as the previously activated getters 106 may have captured a sufficient amount of atoms or molecules within the vacuum enclosure 140 to reach a desired vacuum level.

For many reasons, the vacuum level within the vacuum enclosure 140 may degrade over time. The activation of the second group of the getters 106 may occur later in the lifetime of the apparatus 100*h*. In addition, the activation of other groups of getters may be performed after the pinching off in 1009 after different times and multiple times with multiple different groups of getters. As a result, capacity of getters 106 may remain to capture atoms or molecules present later in the lifetime of the apparatus 100*h*. The getters 106 that remain for later activation may be selected based on an expected type of atoms or molecules that may appear in the vacuum enclosure 140 during the lifetime.

Referring to FIG. 10B, in some embodiments, the operations in 1000' may be similar to the operations in 1000 as described above with respect to FIG. 10A. In 1007, operations may be performed with the vacuum enclosure 140. Examples of such operations include a bakeout operation, activation of first group of the getters 106, conditioning and seasoning of the vacuum enclosure 140 and components, or the like.

In some embodiments, the activation of the first group of getters 106 in 1006 and the operations in 1007 may generate a significant amount of atoms or molecules that need to be removed from the vacuum enclosure 140. A pumping system, may be used to pump out the atoms or molecules. However, some atoms or molecules may be difficult to remove with pumps. For example, hydrogen gas may be difficult to remove. The first group of getters 106 may be selected to have a preference for hydrogen. The first group of getters 106 may be activated by the operation itself. In an particular example, the heat from a bakeout operation may result in a temperature of about 400 to 500° C. That temperature may be matched to the activation temperature of the first group of getters 106.

In some embodiments, a third group of the getters 106 that was not activated may be activated in 1008 before pinching off the vacuum in 1009. For example, bakeout, conditioning, performance tests, and the like may all be complete before the third group of the getters are activated in 1008. The third group of the getters 106 may be activated. As part of the activation any resulting atoms or molecules may be removed before pinch off in 1009, such as by a turbo pump. The removal of the atoms or molecules may be performed until the desired vacuum level is obtained. After pinching off the vacuum enclosure 140 in 1009, the pumping may be discontinued.

Figure 11:
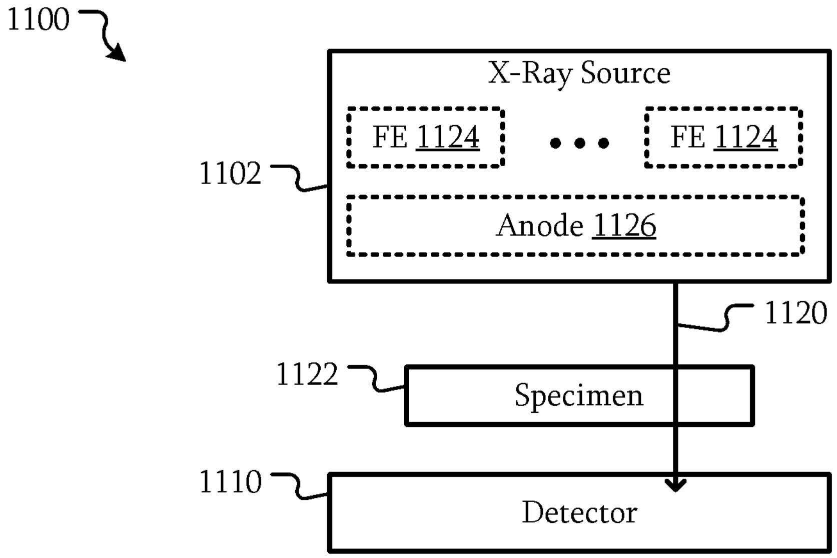
FIG. 11 is a block diagram of an x-ray imaging system according to some embodiments.

FIG. 11 is a block diagram of an x-ray imaging system according to some embodiments. The x-ray imaging system 1100 includes an x-ray source 1102 and detector 1110. The x-ray source 1102 may include an apparatus 100 or the like as described above. In some embodiments, the x-ray source 1102 includes multiple field emitters (FE) 1124. Electron beams from the field emitters 1124 may be directed towards an anode 1126 to generate x-rays 1120. The x-ray source 1102 is disposed relative to the detector 1110 such that x-rays 1120 may be generated to pass through a specimen 1122 and detected by the detector 1110. In some embodiments, the detector 1110 is part of a medical imaging system. In other embodiments, the x-ray imaging system 1100 may include a portable vehicle scanning system as part of a cargo scanning system. The system 1100 may be any system that may include an x-ray detector.

Some embodiments include an apparatus, comprising: a vacuum enclosure 140 including an opening; a support structure 102 disposed in the vacuum enclosure 140, the support structure 102 comprising: a first portion 102*a* attached to the vacuum enclosure 140 at the opening; and a second portion 102*b* extending within the vacuum enclosure 140; and a plurality of getters 106 disposed on the second portion 102*b* of the support structure 102.

In some embodiments, the apparatus further comprises at least one resilient component 110; wherein movement of each of the getters 106 is constrained at least in part by a corresponding one of the at least one resilient component 110.

In some embodiments, for at least one of the getters 106: the getter 106 includes a first end adjacent a corresponding rigid component 108 of the support structure 102 and a second end adjacent to the corresponding one of at least one resilient component 110; the getter 106 contacts the support structure 102 at the first end; and the getter 106 is offset from the support structure 102 at the second end.

In some embodiments, the support structure 102 comprises at least one rigid component 108; each of the getters 106 is constrained by a corresponding one of the at least one rigid component 108.

In some embodiments, the support structure 102 comprises an extendible structure.

In some embodiments, the apparatus further comprises a plurality of feedthroughs 120 penetrating the first portion 102*a* of the support structure 102; wherein: at least one of the getters 106 is electrically connected to the feedthroughs 120.

In some embodiments, at least two of the getters 106 are electrically connected to the feedthroughs 120 in series.

In some embodiments, at least two of the getters 106 are electrically connected to the feedthroughs 120 in parallel.

In some embodiments, at least two of the getters 106 are electrically addressable through the feedthroughs 120.

In some embodiments, at least one of the getters 106 is not electrically addressable through the feedthroughs 120.

In some embodiments, the at least two of the getters 106 electrically addressable through the feedthroughs 120 are electrically addressable through the same feedthroughs 120.

In some embodiments, the getters 106 disposed on the support structure 102 are insertable into the opening from outside of the vacuum enclosure 140.

In some embodiments, the apparatus further comprises an electron emitter 172 disposed in the vacuum enclosure 140; a shield 130 electrical connected to the vacuum enclosure 140 and disposed between the electron emitter and the getters 106.

In some embodiments, the shield 130 includes a plurality of openings.

In some embodiments, the electron emitter 172 comprises multiple field emitters.

In some embodiments, a first type of a first one of the getters 106 is different from a second type of a second one of the getters 106; the first type comprises a first material; the second type comprises a second material; and the first material is different from the second material.

Some embodiments include a method, comprising: providing a support structure 102 including a first portion 102*a* and a second portion 102*b;* mounting a plurality of getters 106 on the second portion 102*b* of the support structure 102; inserting the support structure 102 with the getters 106 into an opening of a vacuum enclosure 140; and attaching the first portion 102*a* of the support structure 102 to the vacuum enclosure 140 at the opening.

In some embodiments, inserting the support structure 102 with the getters 106 into the opening of the vacuum enclosure 140 comprises: inserting the support structure 102 with the getters 106 into the opening of the vacuum enclosure 140 from outside of the vacuum enclosure 140.

In some embodiments, mounting the getters 106 on the second portion 102*b* of the support structure 102 comprises: constraining at least one of the getters 106 between a rigid component 108 and a resilient component 110.

In some embodiments, the method further comprises extending the second portion 102*b* of the support structure 102.

In some embodiments, the method further comprises electrically connecting at least one of the getters 106 to a feedthrough 120 penetrating the first portion 102*a* of the support structure 102.

In some embodiments, the method further comprises not connecting at least one of the getters 106 electrically.

In some embodiments, the method further comprises electrically connecting at least two of the getters 106 in series.

In some embodiments, the method further comprises electrically connecting at least two of the getters 106 in parallel.

In some embodiments, the method further comprises installing an electron emitter within the vacuum enclosure 140; and installing a shield 130 between the electron emitter and the getters 106, wherein the shield 130 is electrically connected to the vacuum enclosure 140.

Some embodiments include an apparatus, comprising: a vacuum enclosure 140; and a plurality of getters 106 disposed in the vacuum enclosure 140; wherein: a first type of a first one of the getters 106 is different from a second type of a second one of the getters 106; the first type comprises a first material; the second type comprises a second material; and the first material is different from the second material.

In some embodiments, an activation temperature of the first type is different from an activation temperature of the second type.

In some embodiments, the apparatus further comprises a plurality of feedthroughs 120 penetrating the vacuum enclosure 140; wherein: at least one of the getters 106 is electrically connected to the feedthroughs 120; and at least one of the getters 106 is not electrically connected to the feedthroughs 120.

In some embodiments, the apparatus further comprises a support structure 102 disposed in the vacuum enclosure 140, the support structure 102 comprising: a first portion 102*a* attached to the vacuum enclosure 140 at an opening in the vacuum enclosure 140; and a second portion 102*b* extending within the vacuum enclosure 140; wherein the getters 106 are disposed on the second portion 102*b* of the support structure 102.

Some embodiments include a method, comprising: providing a vacuum enclosure 140; installing a plurality of getters 106 within the vacuum enclosure 140 wherein: a first type of a first one of the getters 106 is different from a second type of a second one of the getters 106; the first type comprises a first material; the second type comprises a second material; and the first material is different from the second material; establishing a vacuum below a threshold within the vacuum enclosure 140; activating a first group of the getters 106 after establishing the vacuum below the threshold within the vacuum enclosure 140; pinching off the vacuum enclosure 140; and activating a second group of the getters 106 different from the first group of getters 106 such that a majority of a capacity of the second group of getters 106 remains after pinching off the vacuum enclosure 140.

In some embodiments, the method further comprises performing operations with the vacuum enclosure 140 after activating the first group of the getters 106 and before pinching off the vacuum enclosure 140.

In some embodiments, the method further comprises activating a third group of the getters 106 different from the first group of getters 106 and the second group of getters 106 after performing the operations and before pinching off the vacuum enclosure 140.

In some embodiments, activating the first group of the getters 106 further comprises activating the first group of the getters 106 using heat from the operations.

Some embodiments include an apparatus, comprising: means for enclosing a vacuum; a plurality of means for capturing atoms or molecules disposed within the means for enclosing the vacuum; means for supporting the plurality of means for capturing atoms or molecules; and means for attaching the means for supporting the plurality of means for capturing atoms or molecules to the means for enclosing the vacuum.

Examples of the means for enclosing a vacuum include the vacuum enclosure 140. Examples of the plurality of means for capturing atoms or molecules include the getters 106. Examples of the means for supporting the plurality of means for capturing atoms or molecules include the support structure 102 and its various components, rigid components 108 resilient components 110, or the like. Examples of the means for attaching the means for supporting the plurality of means for capturing atoms or molecules to the means for enclosing the vacuum include the 140*c*, the first portions 102*a* of the support structure 102, and the techniques described above to attach the structures.

In some embodiments, the apparatus further comprises at least one of: means for selectively activating the plurality of means for capturing atoms or molecules; means for shielding the plurality of means for capturing atoms or molecules; and means for electrically connecting to at least one of the plurality of means for capturing atoms or molecules.

Examples of the means for selectively activating the plurality of means for capturing atoms or molecules include the feedthroughs 120, the heating elements 122, the associated electrical connections, or the like.

Examples of the means for shielding the plurality of means for capturing atoms or molecules include the shield 130, the conductive plate 107, or the like.

Examples of the means for electrically connecting to at least one of the plurality of means for capturing atoms or molecules include the feedthroughs 120, the associated electrical connections, or the like.

Some embodiments include an apparatus, comprising: means for enclosing a vacuum; and a plurality of means for capturing atoms or molecules disposed within the means for enclosing the vacuum; wherein: a first type of a first one of the plurality of means for capturing atoms or molecules is different from a second type of a second one of the plurality of means for capturing atoms or molecules; the first type comprises a first material; the second type comprises a second material; and the first material is different from the second material.

Examples of the means for enclosing a vacuum include the vacuum enclosure 140. Examples of the plurality of means for capturing atoms or molecules disposed within the means for enclosing the vacuum include the getters 106.

In some embodiments, the apparatus further comprises at least one of: means for performing operations with the means for enclosing the vacuum after activating the first type of the plurality of means for capturing atoms or molecules and before pinching off the means for enclosing the vacuum; means for activating a third type of the plurality of means for capturing atoms or molecules different from the first type of the plurality of means for capturing atoms or molecules and the second type of the plurality of means for capturing atoms or molecules after performing operations with the means for enclosing the vacuum after activating the first type of the plurality of means for capturing atoms or molecules and before pinching off the means for enclosing the vacuum; and means for activating the first type of the plurality of means for capturing atoms or molecules using heat from the operations performed with the means for enclosing the vacuum after activating the first type of the plurality of means for capturing atoms or molecules and before pinching off the means for enclosing the vacuum.

Examples of the means for performing operations with the means for enclosing the vacuum after activating the first type of the plurality of means for capturing atoms or molecules and before pinching off the means for enclosing the vacuum include the electron emitters 172, the anode 173, various pumps described above, or the like.

Examples of the means for activating a third type of the plurality of means for capturing atoms or molecules different from the first type of the plurality of means for capturing atoms or molecules and the second type of the plurality of means for capturing atoms or molecules after performing operations with the means for enclosing the vacuum after activating the first type of the plurality of means for capturing atoms or molecules and before pinching off the means for enclosing the vacuum include the feedthroughs 120, the heating elements 122, inductive heaters, optical heaters, or the like.

Examples of the means for activating the first type of the plurality of means for capturing atoms or molecules using heat from the operations performed with the means for enclosing the vacuum after activating the first type of the plurality of means for capturing atoms or molecules and before pinching off the means for enclosing the vacuum include the electron emitters 172, the anode 173, various pumps described above, or the like.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An apparatus comprising:

a vacuum enclosure including an opening;

a support structure disposed in the vacuum enclosure, the support structure comprising:

a first portion attached to the vacuum enclosure at the opening; and a second portion extending within the vacuum enclosure;

a plurality of getters disposed on the second portion of the support structure;

a first heating element associated with a first getter of the plurality of getters; and a second heating element associated with a second getter of the plurality of getters, wherein the second heating element is connected in series with the first heating element or is individually electrically addressable relative to the first heating element.

2. The apparatus of claim 1, further comprising:

at least one resilient component;

wherein movement of each of the getters is constrained at least in part by a corresponding one of the at least one resilient component.

3. The apparatus of claim 2, wherein for at least one of the getters:

the getter includes a first end adjacent a corresponding rigid component of the support structure and a second end adjacent to the corresponding one of at least one resilient component;

the getter contacts the support structure at the first end; and the getter is offset from the support structure at the second end.

4. The apparatus of claim 1, wherein:

the support structure comprises a plurality of rigid components; and each of the getters is constrained by a corresponding one of the plurality of rigid components.

5. The apparatus of claim 1, wherein:

the support structure comprises an extendible structure.

6. The apparatus of claim 1, further comprising:

a plurality of feedthroughs penetrating the first portion of the support structure;

wherein:

at least one of the getters is electrically connected to the feedthroughs.

7. The apparatus of claim 6, wherein:

at least two of the getters are electrically connected to the feedthroughs in series; and/or at least two of the getters are electrically connected to the feedthroughs in parallel.

8. The apparatus of claim 6, wherein:

at least two of the getters are individually activatable through the feedthroughs.

9. The apparatus of claim 8, wherein:

at least one of the getters is not individually activatable through the feedthroughs.

10. The apparatus of claim 1, wherein:

the getters disposed on the support structure are insertable into the opening from outside of the vacuum enclosure.

11. The apparatus of claim 1, further comprising:

an electron emitter disposed in the vacuum enclosure;

a shield electrically connected to the vacuum enclosure and disposed between the electron emitter and the getters.

12. The apparatus of claim 11, wherein:

the electron emitter comprises multiple field emitters.

13. The apparatus of claim 1, wherein:

a first type of a first one of the getters is different from a second type of a second one of the getters;

the first type comprises a first material;

the second type comprises a second material; and the first material is different from the second material.

14. A method comprising:

providing a support structure including a first portion and a second portion;

mounting a plurality of getters on the second portion of the support structure, wherein the mounting comprises:

attaching a plurality of rigid components to the support structure such that each rigid component of the plurality of rigid components constrains a corresponding getter of the plurality of getters, each of the plurality of rigid components comprising a washer, a nut, or a protrusion rigidly attached to the support structure; and constraining at least one of the getters between a rigid component of the plurality of rigid components and a resilient component;

inserting the support structure with the getters into an opening of a vacuum enclosure; and attaching the first portion of the support structure to the vacuum enclosure at the opening.

15. The method of claim 14, wherein inserting the support structure with the getters into the opening of the vacuum enclosure comprises:

inserting the support structure with the getters into the opening of the vacuum enclosure from outside of the vacuum enclosure.

16. The method of claim 14, further comprising:

extending the second portion of the support structure.

17. The method of claim 14, further comprising:

electrically connecting at least one of the getters to a feedthrough penetrating the first portion of the support structure.

18. An apparatus comprising:

a vacuum enclosure;

a plurality of getters for capturing atoms or molecules disposed within the vacuum enclosure, the plurality of getters comprising:

a first getter with a first heating element; and a second getter with a second heating element electrically connected to the first heating element in series;

a support structure for supporting the plurality of getters, wherein a first portion of the support structure attaches the support structure to the vacuum enclosure.

19. The apparatus of claim 18, further comprising at least one of:

the first heating element and the second heating element selectively activate the plurality of getters; or a feedthrough for electrically connecting to at least one of the plurality of getters.

20. The method of claim 14, wherein at least two of the plurality of getters are electrically addressable through a plurality of feedthroughs.

* * * * *